United States Patent
Sprinkle et al.

(10) Patent No.: US 6,581,710 B2
(45) Date of Patent: Jun. 24, 2003

(54) OPERATOR SELECTED MAXIMUM SPEED AND RECALIBRATED PEDAL RANGE FOR A VEHICLE

(75) Inventors: David L. Sprinkle, Warrenton, GA (US); Mark David Evans, Grovetown, GA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/905,273

(22) Filed: Jul. 13, 2001

(65) Prior Publication Data

US 2003/0013575 A1 Jan. 16, 2003

(51) Int. Cl.7 .............................................. B60K 31/02
(52) U.S. Cl. ........................................ 180/178; 60/448
(58) Field of Search ................................ 180/170, 175, 180/176, 177, 178, 179, 305, 306, 307, 53.4; 60/448; 475/80, 83; 74/513

(56) References Cited

U.S. PATENT DOCUMENTS

| 4,282,711 A | 8/1981 | Branstetter |
| 4,648,803 A | 3/1987 | Stephenson et al. |
| 5,560,203 A | 10/1996 | Pollman |
| 5,703,345 A | 12/1997 | Gollner et al. |
| 6,002,976 A | 12/1999 | Hollstein et al. |
| 6,022,292 A | 2/2000 | Goodnight |
| 6,202,783 B1 | 3/2001 | Taylor et al. |

*Primary Examiner*—Brian L. Johnson
*Assistant Examiner*—Bryan Fischmann
(74) *Attorney, Agent, or Firm*—Polit & Erickson LLC

(57) ABSTRACT

A control system sets a set maximum speed of a utility vehicle, below the capable maximum speed of the vehicle, and recalibrates speed output signals corresponding to the set maximum speed. The system includes a microcontroller and a user-operated vehicle speed actuator, signal-connected to the microcontroller. The speed actuator is calibrated to actuate speeds, via the microcontroller, in a range from a minimum speed to a maximum speed. A user-operated speed set activator is used in conjunction with a ground speed sensor to set the set maximum speed. The microcontroller records the new maximum speed of the vehicle, and recalibrates the pedal position according to the new maximum speed.

21 Claims, 6 Drawing Sheets

OPERATOR SELECTED MAXIMUM SPEED AND RECALIBRATED PEDAL RANGE FOR A VEHICLE

TECHNICAL FIELD OF THE INVENTION

The invention relates to vehicles for industrial and agricultural use, such as utility tractors. Particularly, the invention relates to speed control of a utility vehicle that incorporates a hydrostatic transmission as an operator-controlled speed-adjusting component of the vehicle drive train.

BACKGROUND OF THE INVENTION

Agricultural or industrial utility vehicles typically utilize a drive train having an engine driving a hydrostatic transmission that drives a final drive transmission or range transmission of the vehicle. The final drive transmission drives at least one wheel. JOHN DEERE Series 4000 tractors, available from John Deere Commercial Products, include such drive trains. The vehicle speed is typically operator-modulated by changing the drive ratio of the hydrostatic transmission via movement of a foot pedal. The drive ratio is changed by changing the angle of a swashplate of a variable displacement pump of the hydrostatic transmission.

In the operation of tractors or other self-propelled machinery using hydrostatic transmissions, the maximum speed of operation is often limited to some value less than the full speed capacity of the vehicle. The operator modulates speed to any value less than the selected maximum speed. The operator performs the speed modulation control manually by adjusting foot pedal position. Given the entire pedal position range from a minimum speed up to the maximum speed, a precise modulation of the speed within a narrow speed tolerance between the minimum and maximum speeds is difficult to achieve. Attempting to modulate accurately at a precise speed between the minimum and maximum speeds is fatiguing to the operator, particularly to the operator's leg.

A partial solution to this problem is a kit, available from John Deere Commercial Products for current JOHN DEERE 4000 Series tractors, that provides an adjustable mechanical stop to limit foot pedal travel and thus limit the maximum speed of the tractor. This solution however, cannot adjust to changes in engine speed, nor is it easy to adjust for changes in working conditions. This technique is also not effective for ground speed control in systems using hydrostatic transmissions that lack swashplate position feedback control.

The present inventors have recognized the desirability of providing an adjustable maximum speed control which accurately sets a maximum speed, corresponding to a terminal pedal position, and which allows effective operator speed modulation st speeds less than the set maximum speed.

Additionally, the present inventors have recognized that when operating tractors or other self-propelled machines in which the speed is controlled by a foot pedal or other manual means, it would be desirable to improve the sensitivity of the speed control for better "inching" control, i.e., moving the machine very small distances and/or at very slow speeds.

SUMMARY OF THE INVENTION

A control system is provided for setting a set maximum speed of a utility vehicle, below the capable maximum speed of the vehicle, and recalibrating speed output signals corresponding to the set maximum speed. The system includes a microcontroller and a user-operated vehicle speed actuator, signal-connected to the microcontroller. The speed actuator moves over a limited mechanical range between a start end stop and a terminal end stop, and is calibrated to actuate speeds, via the microcontroller, in a range from a minimum speed to a maximum speed. The maximum speed corresponds to the terminal end stop.

A user-operated speed set activator is used in conjunction with a ground speed sensor to set the maximum speed. The ground speed sensor is signal-connected to the microcontroller, wherein, when initiated by the user, the activator causes the microcontroller to record the instantaneous ground speed signal from the sensor. The microcontroller sets a new maximum speed of the vehicle, the new maximum speed set to the instantaneous ground speed and the pedal position is recalibrated such that the new maximum speed corresponds to the pedal position at the terminal end stop. The microcontroller recalibrates the speed commands issued by the microcontroller to the servo control of the transmission, to be in a range from the minimum speed corresponding to the start end stop to the new maximum speed corresponding to the terminal end stop.

The speed set activator is operable to set a maximum speed for both forward and reverse vehicle operation.

The present invention uses speed control foot pedals with potentiometer sensors, a Hall effect sensor that measures the speed of a gear in the final drive of the transmission, on/off switches, a microcontroller and software. The invention provides a system and method for recalibrating the full pedal range of motion to provide for increased sensitivity of the speed control.

A method of controlling a ground speed of a utility vehicle is set forth. The method is adapted to control speed of a utility vehicle having an engine coupled to a transmission, the transmission coupled to a driven wheel, and a speed actuator movable over an actuator range to a terminal end stop, the actuator calibrated to drive the vehicle at speeds between a minimum speed and a maximum speed, the maximum speed corresponding to the terminal end stop. The method includes the steps of: during running out of the vehicle, selecting an instantaneous ground speed; setting a new maximum vehicle ground speed at the instantaneous ground speed; and recalibrating the actuator range from the minimum speed to the new maximum speed, the new maximum speed corresponding to the terminal end stop.

The operation of the maximum speed function according to the preferred embodiments is more particularly set forth as follows: an on/off switch is positioned to activate the use of the maximum speed function in the microcontroller software. Using the foot pedal controls on the vehicle, the operator drives the vehicle to the maximum speed limit desired for the specific task. Once at the desired maximum speed, a second switch is momentarily depressed and the microcontroller records the speed present in the final drive of the transmission from a Hall effect pulse pickup unit, as a new maximum speed limit. When the operator then releases the control pedal, the vehicle stops and the software becomes temporarily recalibrated so that the recorded new maximum speed limit is achieved with full foot pedal depression. The maximum speed limit can be increased or decreased incrementally during operation by momentarily depressing switches. To prevent the operator from disabling all vehicle motion, the algorithm requires the speed limit to be greater than zero. Moving the maximum speed switch to the off position disables the maximum speed limit function.

The vehicle response is scaled to the set maximum speed. In normal operation, the software in the microcontroller controls the ground speed from zero to the top vehicle speed as a preselected relationship to the pedal position input. When the maximum speed function is engaged, the relationship is rescaled to provide the new maximum set speed corresponding to a fully depressed pedal position. The new ground speed is thereafter controlled by a software control loop using the Hall effect pulse pickup signal for feedback control.

By basing the maximum speed limit on a measured transmission gear speed and using feedback control techniques, the speed limit control becomes insensitive to engine speed, terrain, attachment loading and gear selection. The driver can modulate the speed of the vehicle to any value less than the set maximum speed limit and return to the desired maximum speed limit simply by depressing the speed control pedal to its full travel. Preferably, the set maximum speed limit is the desired substantially constant operating speed. Holding the pedal in its fully depressed position is less fatiguing than having to hold the pedal partially depressed.

A second benefit to the maximum speed function is improved speed control sensitivity. The speed control software can be recalibrated according to a new maximum speed, substantially reduced from the actual maximum speed of the vehicle, so that each increment (inch or mm) of resulting pedal travel represents less speed change than when the maximum speed function is inactive. This permits the driver to optimize his control of the speed and position of the vehicle when attaching implements or working in close spaces.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
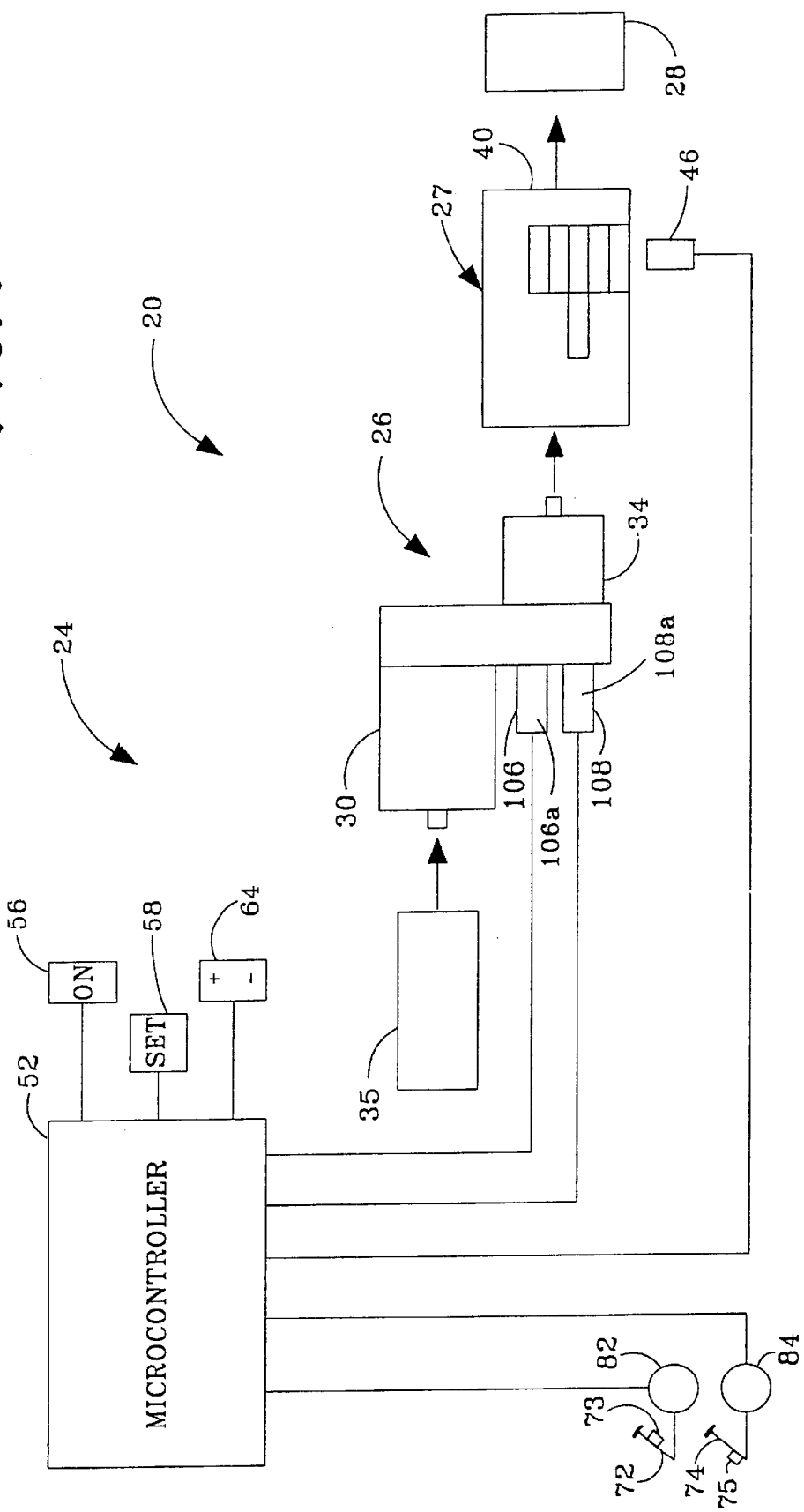
FIG. 1 is block diagram of the method of the utility vehicle speed control system of the present invention.

While this invention is susceptible of embodiment in many different forms, there are shown in the drawings, and will be described herein in detail, a specific embodiment thereof with the understanding that the present disclosure is to be considered as an exemplification of the principles of the invention and is not intended to limit the invention to the specific embodiment illustrated.

FIG. 1 illustrates, in block diagram form, a vehicle 20 incorporating a preferred embodiment drive control system 24 of the present invention. The vehicle incorporates a hydrostatic transmission 26 and a range transmission 27, such as a multi-speed gear transmission, for transmitting power through a differential (not shown) to one or more driven wheels 28.

The hydrostatic transmission 26 includes a variable displacement pump 30, and a hydraulic motor 34. An engine drive 35 rotationally drives the variable displacement pump 30. The hydraulic motor drives the multi-gear transmission drive 27 interposed between the hydraulic motor 34 and the driven wheel 28. The range transmission 27 includes a transmission gear 40. A transmission speed pickup 46, such as a Hall effect sensor, is located in close proximity to the transmission gear 40.

The control system 24 includes a controller 52, such as a microprocessor-based microcontroller, in signal-communication with a speed control on/off switch 56 and an operator-operated speed set activator in the form of a maximum speed set switch 58. The on/off switch 56 enables/disables the maximum speed control algorithm of the microcontroller 52, and the set switch 58 is selectively activated to activate the maximum speed control algorithm in the microcontroller, as described hereinafter. The microcontroller 52 is also in signal-communication with an increase/decrease speed switch 64, the operation of which will be described hereinafter.

The control system 24 includes an operator-operated vehicle speed actuator in the form of a forward pedal 72 and a reverse pedal 74. The forward pedal 72 is operatively engaged with a potentiometer 82 to produce a forward pedal position signal, and a reverse pedal 74 is operatively engaged with a potentiometer 84 to produce a reverse pedal position signal. The potentiometers 82, 84 are signal-connected to the controller 52. The foot pedal 72 is depressible to a terminal position or bottom end stop 73. The foot pedal 74 is depressible to a terminal position or bottom end stop 75.

The controller 52 is signal-connected, through appropriate signal conditioning or amplifying circuitry (not shown), to a solenoid 106a of a forward drive proportional pressure control valve 106 and to a solenoid 108a of a reverse drive proportional pressure control valve 108. The output current to energize the forward or reverse control valve solenoids 106a, 108a is substantially proportional to the corresponding pedal position signal.

Figure 2:
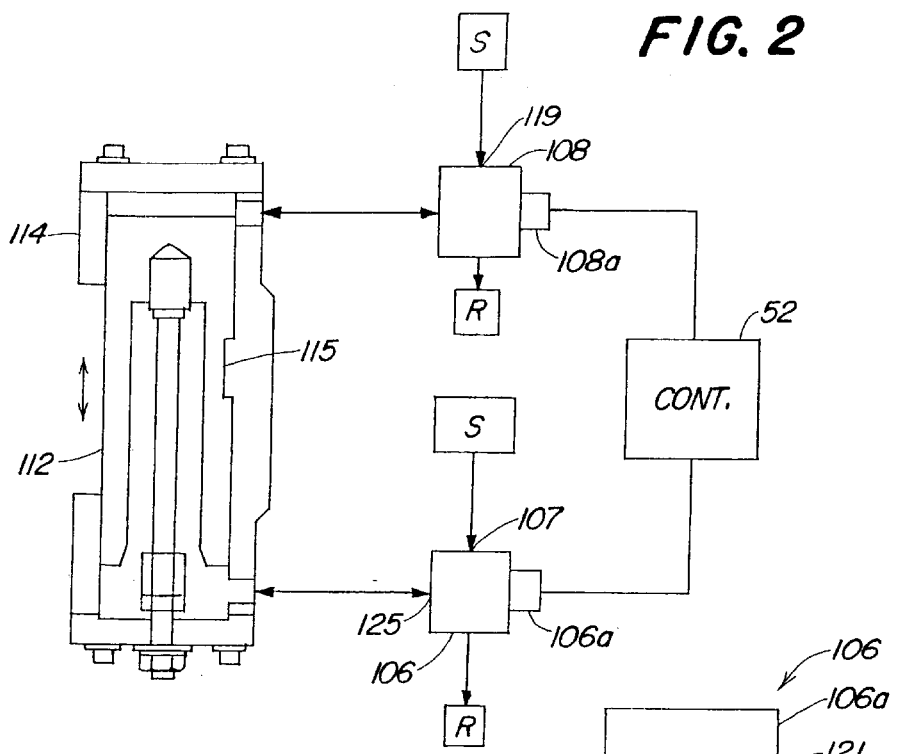
FIG. 2 is a schematic sectional view of the servo control system used in a hydrostatic transmission of FIG. 1.
Figure 3:
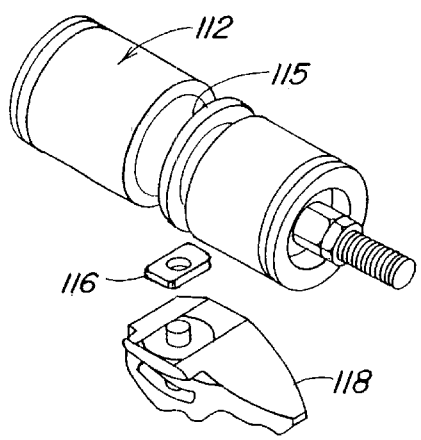
FIG. 3 is an exploded, fragmentary perspective view of the servo control system of FIG. 2.

FIGS. 2 and 3 illustrate the hydrostatic transmission servo control in more detail. Given an engine drive speed and a range transmission or final drive gear selection, the hydrostatic transmission provides infinitely variable speed control, forward and reverse, by operation of the foot pedals 72, 74. Each valve 106, 108 is connected to a source of pressurized hydraulic fluid S and a return channel R that is at a reduced hydraulic pressure. Preferably, the return channel R recirculates hydraulic fluid back to the reservoir of the vehicle's hydraulic system.

Depressing the forward foot pedal 72 causes an electrical output signal or voltage of the potentiometer 82 to be transmitted to the controller 52. The controller 52, through software, generates a pre-selected current ramp output, to energize the solenoid 106a of the forward drive proportional valve 106. The proportional valve 106 is opened according to the ramp output, allowing pressurized hydraulic fluid, fed from the source S into the inlet 107 of the valve 106, to flow through the valve 106. The pressurized hydraulic fluid is communicated into, and pressurizes, a servo cylinder 114 on one side of a servo piston 112 that is slidably housed in the cylinder 114. The other valve 108 allows fluid to flow from within the cylinder 114, from an opposite side of the servo piston 112, to the return channel R.

The piston 112 has a notch 115 that holds a piston follower 116 (FIG. 3). The piston follower 116 controls movement of a variable displacement pump cam plate or swashplate 118. Movement of the piston 112 causes the swashplate 118 in the hydraulic pump to rotate out of the neutral position. Maximum displacement of the pump 30 is attained when the servo piston 112 is moved to its extreme position. The swashplate 118 can be positioned in a range of forward positions selected by the foot pedal 72.

When the reverse pedal 74 is pressed, the potentiometer 84 sends an electrical output signal or voltage to the controller 52. The controller 52, through software, generates a pre-selected current output ramp to energize the solenoid 108a of the reverse drive proportional valve 108. The reverse drive proportional valve 108 is opened, according to the ramp output, to allow pressurized hydraulic fluid, fed into an inlet 119 of the valve 108 from the source S, to flow through the valve 108. The pressurized hydraulic fluid is communicated into, and pressurizes the servo cylinder 114 on an opposite side of the servo piston 112 within the cylinder 114. The other valve 106 allows fluid to flow from within the cylinder 114, from the one side of the servo piston 112, to the return channel R.

Preferably, the valve solenoids 106a, 108a are driven by pulse width modulation type currents and causes pressure to be modulated at the outlet proportionally according to the controlled width of step pulses of current applied. While the frequency of the pulses remains substantially the same, the pulse widths are changed to modulate the valves.

The hydrostatic system is preferably a closed loop fluid power system that consists of a charge pump (not shown), and the variable displacement pump 30, which is driven by a flex plate/dampener assembly (not shown) connected to the engine flywheel. The charge pump provides pressurized fluid to the proportional valve inlets 107, 119. Return fluid from the servo control unit is routed to the reservoir of the vehicles hydraulic system.

Figure 3A:
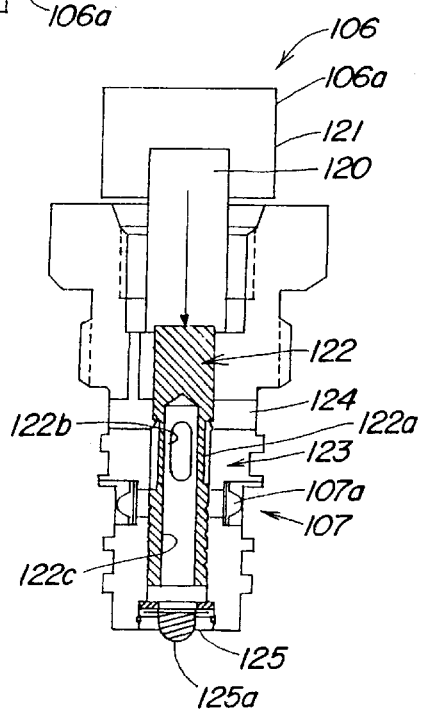
FIG. 3A is a schematic sectional view of a proportional pressure control valve of the system of FIG. 3.

An exemplary example of a control valve, such as the control valve 106, is illustrated in FIG. 3A. The solenoid 106a includes a plunger 120 (shown schematically) driven by the solenoid coil 121 (shown schematically). The plunger 120 drives a valve spool 122 within a housing 123. The housing provides the pressurized hydraulic fluid inlet 107, in the form of plural openings, and an outlet 124, in the form of plural openings, to the hydraulic fluid reservoir. A control pressure outlet 125 communicates hydraulic fluid at a modulated pressure to the servo cylinder 114 as shown in FIG. 2. The solenoid coil 121 drives the plunger 120 downward (in FIG. 3A) to open the inlet 107 to the outlet 125 through an annular channel 122a.

The channel 122a is open to an oblong orifice 122b through the spool 122 to communicate fluid into an interior 122c of the spool. The interior of the spool is open to the outlet 125. The pressure of the hydraulic fluid at the control outlet 125 is substantially proportional to the force applied to the spool by the plunger, ranging between reservoir pressure, the pressure at the outlet 125 with the inlet 107 closed, as shown in FIG. 3A, to pressurized hydraulic fluid supply pressure, the spool 122 moved down to close the outlet 124 and open the inlet 107.

An annular screen 107a and a circular screen 125a can be supplied to the inlet 107 and to the outlet 125 respectively.

The control valve 108 can be identically configured as described above for the control valve 106.

Figure 4:
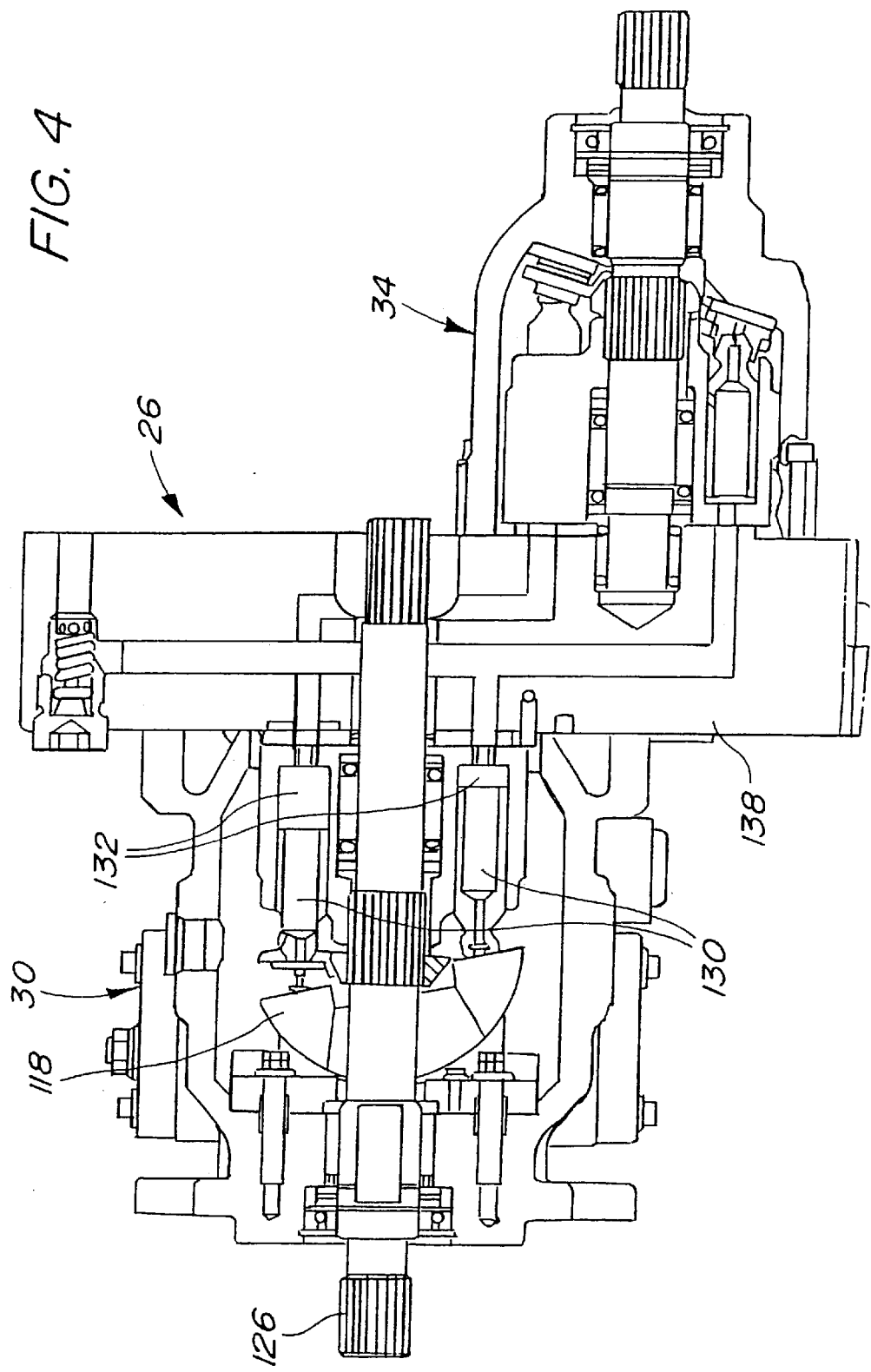
FIG. 4 is a schematic sectional view of a hydrostatic transmission.

FIG. 4 illustrates the hydrostatic transmission 26 in more detail. The hydrostatic pump 30 illustrated is an axial piston, servo controlled, variable displacement piston pump. Input shaft splines 126 are driven via a flex plate (not shown) bolted onto the engine flywheel (not shown).

Fluid flow through the pump 30 is controlled by changing the angle of the swashplate 118. The location, off center, of the swashplate controls the distance the pistons 130 travel inside the piston bores 132 of the rotating assembly. The direction that the swashplate is rotated from center determines the direction of fluid flow (forward or reverse). The number of degrees the swashplate is deflected determines how much fluid will be displaced, i.e., controlling the transmission speed.

The hydrostatic pump 30 provides hydraulic fluid to the hydrostatic motor 34 through the back plate 138. Hydraulic fluid in the power train circulates in a closed loop. Fluid leaves the hydrostatic pump 30, flows through the hydrostatic motor 34, and is returned to the hydrostatic pump. Fluid that leaves this closed loop circuit, such as to the case drain, is replenished by fluid from the charge pump.

The hydrostatic motor 34 is a high torque axial piston motor. The motor is located on the rear of the back plate. The hydrostatic motor drives an output shaft coupled to the range transmission 27 that transfers power to the wheels. The range transmission 27 can be a multi-speed range gear transmission, such as a three-speed or four-speed gearbox.

The speed control system 24 of the invention can be activated by pushing the on/off switch 56 and then operating the vehicle to the desired ground speed and then activating the set switch 58 to select the desired maximum set speed that corresponds to the ground speed at that instant. The operator then releases the respective control pedal 72 or 74, the vehicle stops, and the controller 52 recalibrates the pedal travel up to the new maximum set speed corresponding to the foot pedal 72 located against the end stop 73 or the foot pedal 74 located against the end stop 75. The speed control algorithm of the controller 52 thereafter will control the speed throughout pedal travel in a range up to the maximum set speed using a PID routine as described below with regard to FIGS. 5 and 6. If it is desired to increase or decrease the set maximum speed by a preselected percentage, an increase/decrease speed switch 64 can be activated to incrementally increase or decrease the set speed as described below with regard to FIG. 7. The maximum speed control function can be turned off by the switch 56 that activates maximum speed control.

Figure 5:
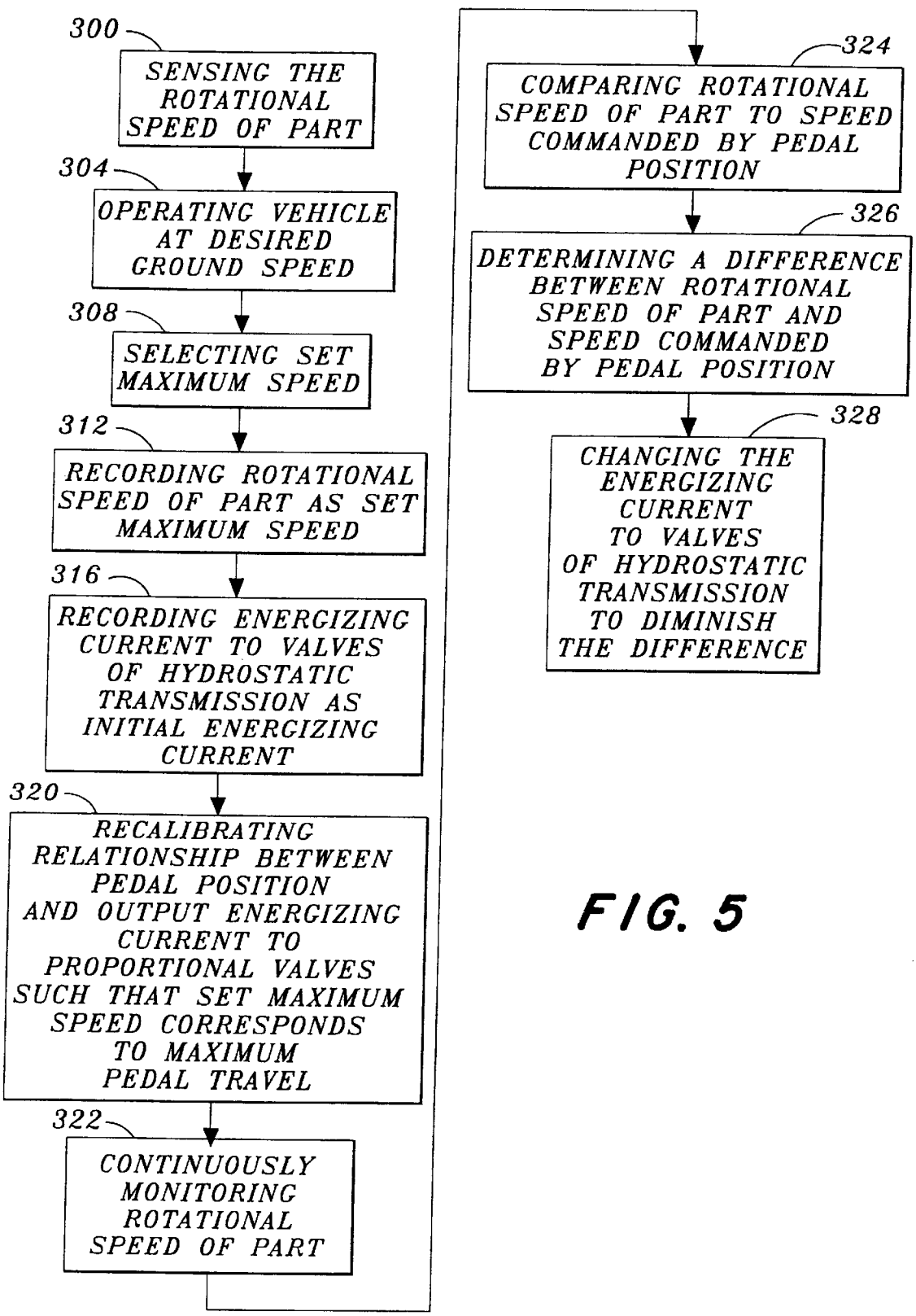
FIG. 5 is a block diagram of the speed control algorithm steps of the present invention.

A method of controlling the speed of a utility vehicle is set forth in FIG. 5. The method includes the steps of: step 300, continuously sensing the rotational speed of a rotating part in a range transmission of the vehicle; step 304, operating the vehicle at a desired ground speed; step 308, at the desired ground speed, selecting the rotational speed as a set speed; step 312, recording the rotational speed of the part as a set speed; step 316, recording the energizing current to the proportional control valves of the hydrostatic transmission as an initial energizing current; step 320, recalibrating the relationship between the pedal travel and the microcontroller output to the proportional valves such that the set maximum speed corresponds to the maximum pedal travel; step 322, monitoring the rotational speed of the rotating part; step 324, comparing the rotational speed to the speed commanded by the pedal position; step 326, determining a difference between the rotational speed and the speed commanded by the pedal position; and step 328, if the rotational speed of the rotating part differs from the speed commanded by the pedal position, using a correction algorithm routine to change the energizing current to the proportional control valves of the hydrostatic transmission to change the transmission speed output to diminish the difference.

Figure 6:
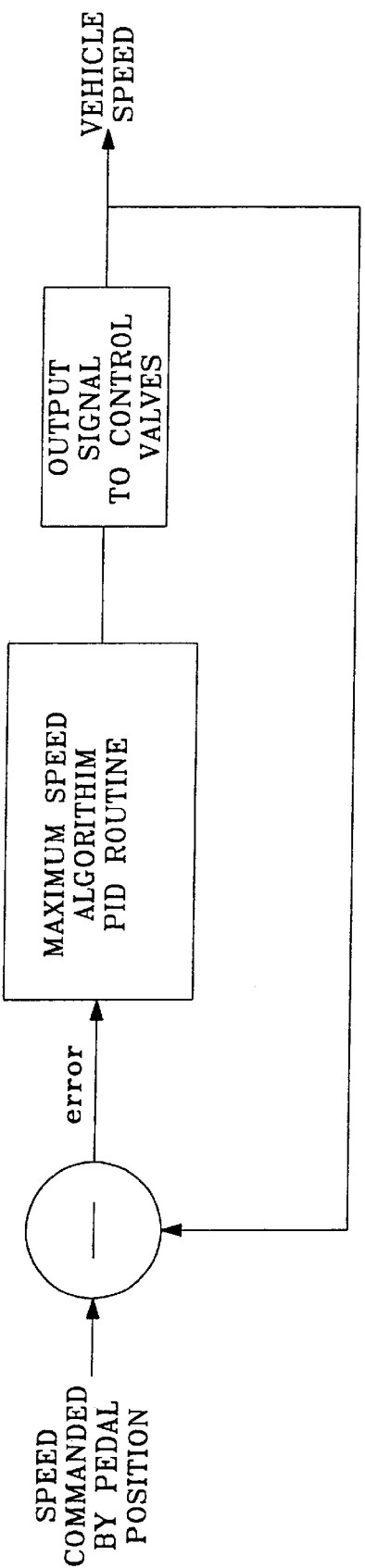
FIG. 6 is a block diagram of a speed control algorithm routine incorporated into the present invention.

FIG. 6 illustrates a control algorithm routine of the software of the microcontroller 52 which compares the vehicle ground speed as sensed by the Hall effect pickup unit 46 to the speed commanded by the pedal position sensor, and which uses PID (proportional, integral, derivative) feedback control mathematics to diminish the difference by controlling the speed output of the hydrostatic transmission. The routine changes the output signal from the microcontroller to the proportional control valves to reduce or increase the hydrostatic transmission speed output.

Figure 7:
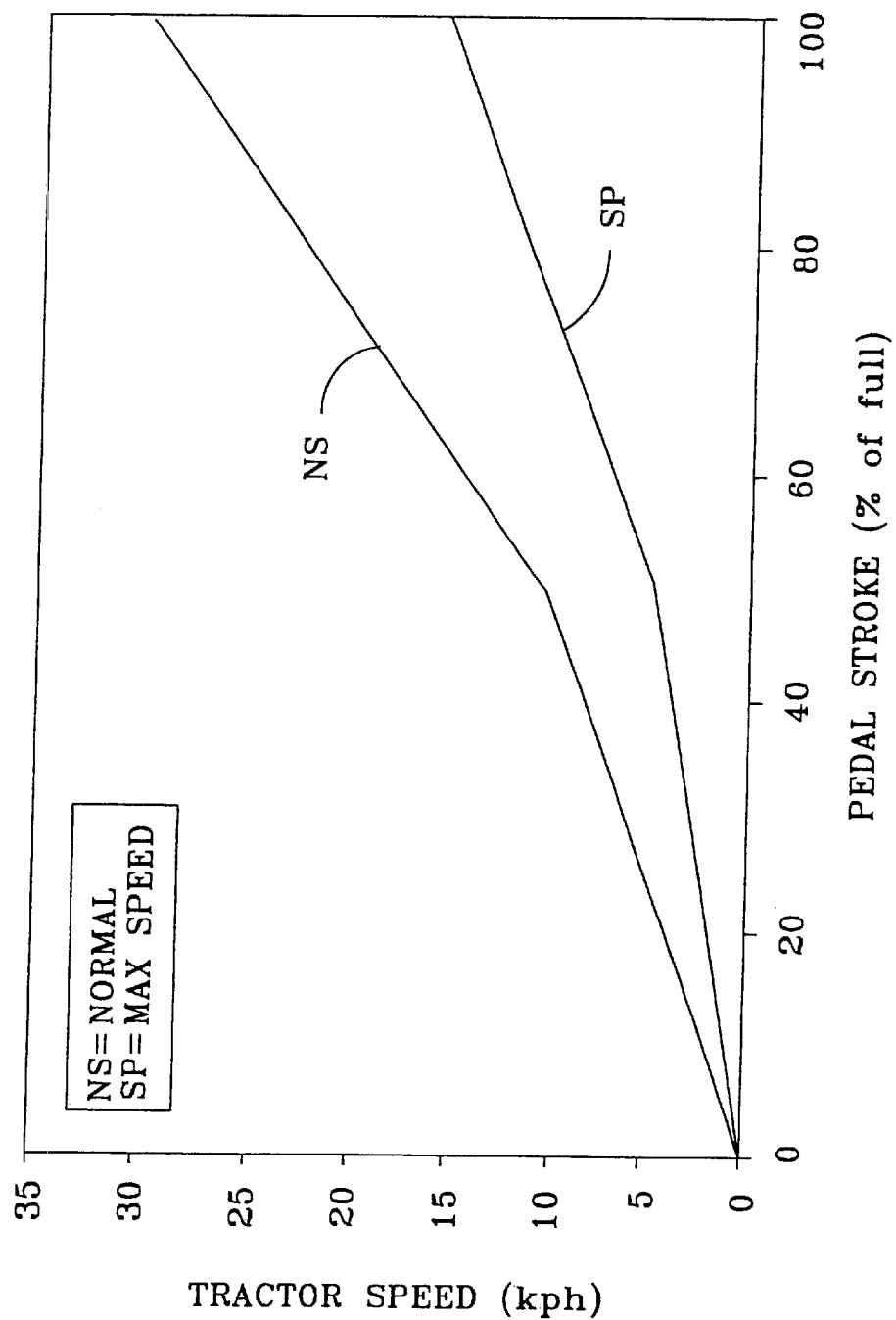
FIG. 7 is a speed calibration diagram demonstrating the operation of the present invention.

FIG. 7 illustrates the proportional relationship between the vehicle speed and the and pedal stroke, or position, for two speed profiles, a normal speed profile NS wherein the maximum speed is approximately the maximum speed of the vehicle, and a set maximum speed profile SP wherein the maximum speed, corresponding to the foot pedal terminal position, is a reduced maximum speed. The speed profiles shown in FIG. 7 illustrate a maximum speed of 30 kph for the normal speed profile NS, and a maximum speed of 15 kph for the maximum set speed profile SP. Both speed profiles include an inflection at about 50 percent of pedal stroke for increased vehicle drivability.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A speed control system for a utility vehicle, driven by an operator, comprising:
    a vehicle drivetrain for moving said utility vehicle at a ground speed;
    a controller having a speed control input for receiving a speed control input signal, and a speed control output for producing a speed control output signal, said speed control output signal-connected to the vehicle drivetrain to adjust the ground speed of said vehicle, said controller being software-controlled for determining a relationship between said speed control input signal and said speed control output signal, wherein a maximum speed control input signal produces a maximum speed control output signal;
    an operator-operated vehicle speed actuator, signal-connected to said speed control input of said controller, said speed actuator moves over a travel range from a first position to an end stop, and produces said speed control input signal corresponding to actuator position within the travel range, said speed control input signal being in a range from a reduced speed control input signal to said maximum speed control input signal, wherein said maximum speed control input signal corresponds to said actuator being at said end stop;
    an operator-operated speed set activator;
    a speed sensor, arranged to output an instantaneous speed signal that is proportional to ground speed of the vehicle, said speed sensor being signal-connected to said controller, wherein, when said speed set activator is activated by the operator at a desired maximum ground speed, said activator causes said controller to record said instantaneous speed signal from said speed sensor as a maximum speed signal, said controller thereafter using said instantaneous speed signal to set a new maximum speed control output signal that produces said desired maximum ground speed, and said controller rescales said relationship between said speed control input signal and said speed control output signal wherein said maximum speed control input signal, when said actuator is at said end stop, produces said new maximum speed control output signal.

2. The control system according to claim 1, wherein said actuator comprises a foot pedal.

3. The control system according to claim 1, wherein, when said speed set activator is activated by the operator at a desired maximum ground speed, said activator causes said controller to record said speed control output signal as an initial speed control output signal, and after said vehicle is stopped said controller sets said initial speed control output signal as said new maximum speed control output signal and rescales said relationship between said speed control input signal and said speed control output signal.

4. The control system according to claim 1, wherein said controller includes a speed control feedback routine that uses instantaneous speed signal from said speed sensor and compares said instantaneous speed signal to said maximum speed signal, said controller adjusts said new maximum speed control output signal to diminish any difference between said instantaneous speed signal and said maximum speed signal.

5. The control system according to claim 1, further comprising a speed increase switch, signal-connected to said controller, actuation of said speed increase switch incrementally increases said new maximum speed control output signal and rescales said relationship between said speed control input signal and said speed control output signal.

6. The control system according to claim 5, further comprising a speed decrease switch, signal-connected to said controller, actuation of said speed decrease switch incrementally decreases said new maximum speed control output signal and rescales said relationship between said speed control input signal and said speed control output signal.

7. The control system according to claim 1, further comprising a speed decrease switch, signal-connected to said controller, actuation of said speed decrease switch incrementally decreases said new maximum speed control output signal and rescales said relationship between said speed control input signal and said speed control output signal.

8. The control system according to claim 1, wherein said vehicle drivetrain comprises a hydrostatic transmission having a swashplate, and forward and reverse proportional control valves, and said speed control output signal is signal-connected to said proportional control valves to selectively energize said proportional control valves to alter the position of the swashplate.

9. The control system according to claim 8, wherein said speed sensor comprises a Hall effect pulse pickup unit mounted to said transmission to read pulses from gear teeth of a gear of said transmission.

10. A method of controlling a ground speed of a utility vehicle, the utility vehicle having an engine coupled to a transmission, the transmission coupled to a driven wheel, and a speed actuator movable over an actuator range to an end stop, said actuator calibrated to drive the vehicle at speeds between a minimum speed and a maximum speed, said maximum speed corresponding to said end stop, comprising the steps of:

controlling speed of said vehicle by adjusting the output of the transmission by the use of an actuator;

during running out of said vehicle, selecting an instantaneous ground speed;

setting a new maximum vehicle ground speed as said instantaneous ground speed; and recalibrating the speed actuator so that the actuator range drives the vehicle at speeds from said minimum speed to said new maximum vehicle ground speed, said new maximum vehicle ground speed corresponding to said speed actuator being at said end stop.

11. The method according to claim 10, comprising the further step of selecting a further new maximum vehicle ground speed by manually increasing or decreasing the new maximum vehicle ground speed by an incremental amount.

12. The method according to claim 10, wherein said new maximum vehicle ground speed is continuously controlled by feedback from a speed sensor.

13. The method according to claim 10, comprising the further steps of:

during running out of said vehicle, with said speed actuator at said end stop, continuously sensing actual ground speed and comparing ground speed to said new maximum vehicle ground speed and recalibrating said speed actuator to diminish a difference between said actual ground speed and said new maximum vehicle ground speed.

14. A speed control system for a utility vehicle, driven by an operator, comprising:

a controller having a speed control input for receiving a speed control input signal, and a speed control output for producing a speed control output signal, said speed control output signal-connected to the vehicle drive train to adjust ground speed of said vehicle, said controller being software-controlled for determining the relationship between said speed control input signal and said speed control output signal, wherein a maximum speed control input signal produces a maximum speed control output signal;

an operator-operated vehicle speed actuator, signal-connected to said speed control input of said controller, said speed actuator moves over a limited mechanical range from a start position to an end stop, and produces said speed control input signal corresponding to actuator position within the mechanical range, said speed control input signal being in a range from a minimum speed control input signal to said maximum speed control input signal, wherein said maximum speed control input signal corresponds to said actuator being at said end stop;

an operator-operated speed set activator, wherein, when said speed set activator is activated by the operator at a desired maximum ground speed, said activator causes said controller to record an instantaneous speed control output signal produced by said controller, said instantaneous speed control output signal is thereafter set as the new maximum speed control output signal, said controller rescales said relationship between said speed control input signal and said speed control output signal wherein said maximum speed control input signal, when said actuator is at said end stop, produces the new maximum speed control output signal.

15. The control system according to claim 14, further comprising a speed sensor, arranged to output an instantaneous speed signal proportional to ground speed of the vehicle, said speed sensor being signal-connected to said controller, wherein when activated by the operator, said activator causes said controller to record said instantaneous speed signal from said speed sensor as a maximum speed signal, said controller thereafter using said instantaneous speed signal in comparison to said maximum speed signal to continuously adjust said new maximum speed control output signal to produce said desired maximum ground speed when said actuator is at said end stop.

16. The control system according to claim 15, wherein, when said speed set activator is activated by the operator at a desired maximum ground speed, said activator causes said controller to record said speed control output signal as an initial speed control output signal, and after said vehicle is stopped said controller sets said initial speed control output signal as said new maximum speed control output signal and rescales said relationship between said speed control input signal and said speed control output signal.

17. The control system according to claim 15, wherein said controller includes a PID speed control feedback routine that uses said instantaneous speed signal from said speed sensor and compares said instantaneous speed signal to said maximum speed signal, said controller adjusts said new maximum speed control output signal to diminish any difference between said instantaneous speed signal and said maximum speed signal.

18. The control system according to claim 14, further comprising a speed increase switch, signal-connected to said controller, actuation of said speed increase switch incrementally increases said new maximum speed control output signal and rescales said relationship between said speed control input signal and said speed control output signal.

19. The control system according to claim 18, further comprising a speed decrease switch, signal-connected to said controller, actuation of said speed decrease switch incrementally decreases said new maximum speed control output signal and rescales said relationship between said speed control input signal and said speed control output signal.

20. The control system according to claim 14, wherein said drivetrain comprises a hydrostatic transmission having a swashplate, and forward and reverse proportional control valves, and said speed control output signal is signal-connected to said proportional control valves to selectively energize said proportional control valves to alter the position of the swashplate.

21. The control system according to claim 14, further comprising a speed sensor, wherein said speed sensor comprises a Hall effect pulse pickup unit mounted to said transmission to read pulses from gear teeth of a gear of said transmission, said speed sensor arranged to output an instantaneous speed signal proportional to ground speed of the vehicle, said speed sensor being signal-connected to said controller, wherein when initiated by the operator, said activator causes said controller to record said instantaneous speed signal from said speed sensor as a maximum speed signal, said controller thereafter using said instantaneous speed signal in comparison to said maximum speed signal to continuously adjust said new maximum speed control output signal to produce said desired maximum ground speed when said actuator is at said end stop.

* * * * *